United States Patent
Kaml et al.

(10) Patent No.: US 9,634,472 B2
(45) Date of Patent: Apr. 25, 2017

(54) ADJUSTABLE CABLE MANAGERS

(71) Applicants: TYCO ELECTRONICS CORPORATION, Berwyn, PA (US); ADC TELECOMMUNICATIONS, INC., Berwyn, PA (US)

(72) Inventors: Jonathan R. Kaml, Shakopee, MN (US); James Joseph Eberle, Jr., Hummelstown, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 194 days.

(21) Appl. No.: 14/483,643

(22) Filed: Sep. 11, 2014

(65) Prior Publication Data
US 2015/0076087 A1 Mar. 19, 2015

Related U.S. Application Data

(60) Provisional application No. 61/877,580, filed on Sep. 13, 2013.

(51) Int. Cl.
| | |
|---|---|
| *H02G 3/08* | (2006.01) |
| *F16M 13/02* | (2006.01) |
| *G02B 6/46* | (2006.01) |
| *H02G 3/32* | (2006.01) |
| *H04Q 1/06* | (2006.01) |
| *H04Q 1/08* | (2006.01) |
| *H04Q 1/02* | (2006.01) |

(52) U.S. Cl.
CPC ............ *H02G 3/08* (2013.01); *F16M 13/022* (2013.01); *G02B 6/46* (2013.01); *H02G 3/32* (2013.01); *H04Q 1/06* (2013.01); *H04Q 1/08* (2013.01); *H04Q 1/09* (2013.01)

(58) Field of Classification Search
CPC .. H02G 3/32; F16L 3/2235; F16L 3/10; F16L 3/227; A47B 2097/003
See application file for complete search history.

(56) References Cited

U.S. PATENT DOCUMENTS 429,357 A * 6/1890 McBee ................. F16L 3/2235
24/135 R
1,893,166 A 1/1933 Fox
(Continued)

FOREIGN PATENT DOCUMENTS

DE 718025 2/1942
DE 1 031 855 6/1958
(Continued)

OTHER PUBLICATIONS

International Search Report and Written Opinion for Application No. PCT/US2014/055073 mailed Dec. 22, 2014.

*Primary Examiner* — Bradley Duckworth
(74) *Attorney, Agent, or Firm* — Merchant & Gould P.C.

(57) ABSTRACT

A cable management system includes elongated members mounted to a panel; and gate members configured to couple to at least some of the elongated members. Adjacent ones of the elongated members define management regions therebetween. Each gate member is rotatable relative to the respective elongated member to selectively inhibit and allow access to the respective management region. Each gate member can be fixed at any axial point along an adjustment region of the respective elongated member to adjust the depth of the management region.

22 Claims, 17 Drawing Sheets

(56) References Cited

U.S. PATENT DOCUMENTS

| | | | | |
|---|---|---|---|---|
| 3,023,989 | A * | 3/1962 | White | F16L 3/2235 174/135 |
| 3,252,677 | A * | 5/1966 | Raymond | F16B 5/123 248/68.1 |
| 3,430,903 | A | 3/1969 | Mathes | |
| 3,746,291 | A | 7/1973 | Kühn | |
| 3,866,871 | A * | 2/1975 | Dupuy, Sr. | F16L 3/2235 248/59 |
| 4,131,257 | A | 12/1978 | Sterling | |
| 4,936,530 | A * | 6/1990 | Wollar | F16B 2/12 248/68.1 |
| 5,582,612 | A | 12/1996 | Lin | |
| 5,613,968 | A | 3/1997 | Lin | |
| 5,992,802 | A * | 11/1999 | Campbell | H02G 3/30 248/68.1 |
| 6,175,079 | B1 | 1/2001 | Johnston et al. | |
| 6,206,879 | B1 | 3/2001 | Marnay et al. | |
| 6,398,149 | B1 | 6/2002 | Hines et al. | |
| 6,979,064 | B2 | 12/2005 | Chiu | |
| 7,077,688 | B2 | 7/2006 | Peng | |
| 7,657,985 | B2 | 2/2010 | McClure | |
| 7,686,259 | B2 | 3/2010 | Caveney et al. | |
| 7,770,852 | B2 | 8/2010 | Caveney | |
| 7,817,444 | B2 | 10/2010 | Dennes | |
| 8,093,501 | B2 | 1/2012 | Stansberry, Jr. | |
| 8,551,146 | B2 | 10/2013 | Kumar et al. | |
| 8,708,290 | B2 | 4/2014 | Franta | |
| 8,888,053 | B2 * | 11/2014 | Blanchard | B64C 1/406 248/68.1 |
| 8,944,111 | B2 * | 2/2015 | Allendorf | F16L 3/2235 138/106 |
| 2005/0171537 | A1 | 8/2005 | Mazel et al. | |
| 2005/0211463 | A1 | 9/2005 | Zeuner et al. | |
| 2006/0171075 | A1 | 8/2006 | Caveney et al. | |
| 2008/0130261 | A1 | 6/2008 | Dennes | |
| 2010/0226616 | A1 | 9/2010 | Zheng | |
| 2011/0011612 | A1 | 1/2011 | Sayres | |
| 2012/0049011 | A1 * | 3/2012 | Liu | H02G 3/32 248/68.1 |
| 2013/0146721 | A1 | 6/2013 | White | |
| 2014/0060891 | A1 * | 3/2014 | Deshaies | H02G 3/30 174/163 R |
| 2015/0214709 | A1 * | 7/2015 | Landry | H02G 3/32 248/74.2 |

FOREIGN PATENT DOCUMENTS

| | | |
|---|---|---|
| DE | 3416512 C1 | 7/1985 |
| DE | 10 2009 038 911 A1 | 3/2011 |
| DE | 10 2010 007 256 A1 | 8/2011 |
| GB | 1 413 547 A | 11/1975 |
| GB | 2486682 A | 6/2012 |
| JP | 7-87656 | 3/1995 |
| JP | 2001-20507 A | 1/2001 |
| JP | 2010-156421 A | 7/2010 |
| WO | WO 2010/053777 A2 | 5/2010 |
| WO | WO 2011/161923 A1 | 12/2011 |

* cited by examiner

ADJUSTABLE CABLE MANAGERS

CROSS-REFERENCE TO RELATED APPLICATION

This application claims the benefit of U.S. Provisional Application No. 61/877,580, filed Sep. 13, 2013, and titled "Adjustable Cable Managers," the disclosure of which is hereby incorporated herein by reference.

BACKGROUND

Telecommunications systems utilize fiber optic cables and/or copper cables to interconnect pieces of telecommunications equipment. The pieces of telecommunications equipment are commonly mounted to racks, cabinets, or other framework structures. Because of the large number of cables associated with such telecommunications systems, effective cable management is crucial. Ease of cable organization and cable management adaptation are factors related to effective cable management. In general, conventional arrangements for managing cable can be improved.

SUMMARY

Some aspects of the disclosure are directed to an adjustable cable manager including an elongated member; and a gate member configured to couple to the elongated member. The gate member is movable along an adjustment region of the elongated member. The gate member is configured to be releasably fixed at any point along the adjustment region. The gate member includes a gate extending outwardly transverse to the elongated member.

In certain implementations, the gate member is rotatable relative to the elongated member between an open and closed position. The gate extends outwardly in a first direction when the gate member is in the open position and the gate extends in a second direction when the gate member is in the closed position. In an example, the second direction is offset generally orthogonally from the first direction.

In certain implementations, the elongated member and the gate member cooperate to define an alignment arrangement that inhibits rotation of the at least one gate relative to the elongated member when the gate member is not disposed at the one end of the adjustment region.

Certain types of cable managers include a locking member configured to move relative to the gate member between a first position and a second position. The locking member allows the gate member to move along the adjustment region of the elongated member when the locking member is disposed in the first position. The locking member fixes the gate member in position relative to the elongated member when the locking member is disposed in the second position.

Certain types of cable managers include a threaded rod disposed within the elongated member. The gate member is mounted to the threaded rod so that rotation of the threaded rod causes the gate member to move axially along the threaded rod relative to the elongated member. The elongated member defines at least one track and a portion of the gate member rides within the track when the gate member is moved along the adjustment region. In an example, gates of the gate member extend outwardly from the elongated member through the track. In another example, the gates extend from a frame that surrounds the elongated member.

Certain types of cable managers include multiple gate members. Certain types of cable managers include gate members with multiple sets of axially spaced gates. Certain types of cable managers include retention features on the elongated members that cooperate with parts of the gate members to inhibit axial movement of the gate members.

Other aspects of the disclosure relate to a cable management system including a panel at which cable management regions are defined; and cable managers mounted to the panel. Each cable manager includes an elongated member and at least a first gate that is configured to rotate to selectively inhibit or allow access to a respective one of the cable management regions. The first gate also is configured to translate (e.g., slide) axially to adjust a depth of the respective cable management region and to be axially fixed at any point along an adjustment region of the cable manager.

In certain implementations, axially extending structures are mounted to the panel. Each axially extending structure cooperates with at least one of the cable managers to define one of the cable management regions. In an example, the axially extending structures are identical to the elongated members of the cable managers.

Other aspects of the disclosure relate to a method of managing cables along a panel to which a plurality of elongated members are mounted. The method includes rotating a gate member relative to a respective one of the elongated members to an open position to uncover an entrance to a management region defined between the respective elongated member and an adjacent elongated member; inserting at least one cable into the management region; rotating the gate member relative to the respective elongated member to a closed position to move a gate of the gate member across the entrance to the management region to close the management region; and translating the gate member axially along the respective elongated member while the gate member is disposed in the closed position to adjust a size of the management region to accommodate the at least one cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, a cable management system includes a panel at which cable management regions are defined; and cable managers mounted to the panel. Each cable manager includes an elongated member and at least a first gate that is configured to rotate to selectively inhibit or allow access to a respective one of the cable management regions. The first gate also is configured to axially translate (e.g., slide) to adjust a depth of the respective cable management region and to be axially fixed at any point along an adjustment region of the cable manager.

A method of managing cables along a panel to which a plurality of cable managers are mounted includes rotating a gate member of the cable manager relative to an elongated member of the cable manager to open a management region at the panel; adding at least one cable to the management region; rotating the gate member relative to the respective elongated member to close the management region; and translating the gate member axially along the respective elongated member to adjust a size of the management region to accommodate the cable. The gate member can be translated while the cable management region is closed. When in a desired position, the gate member is inhibited against inadvertent axial movement.

Figure 1:
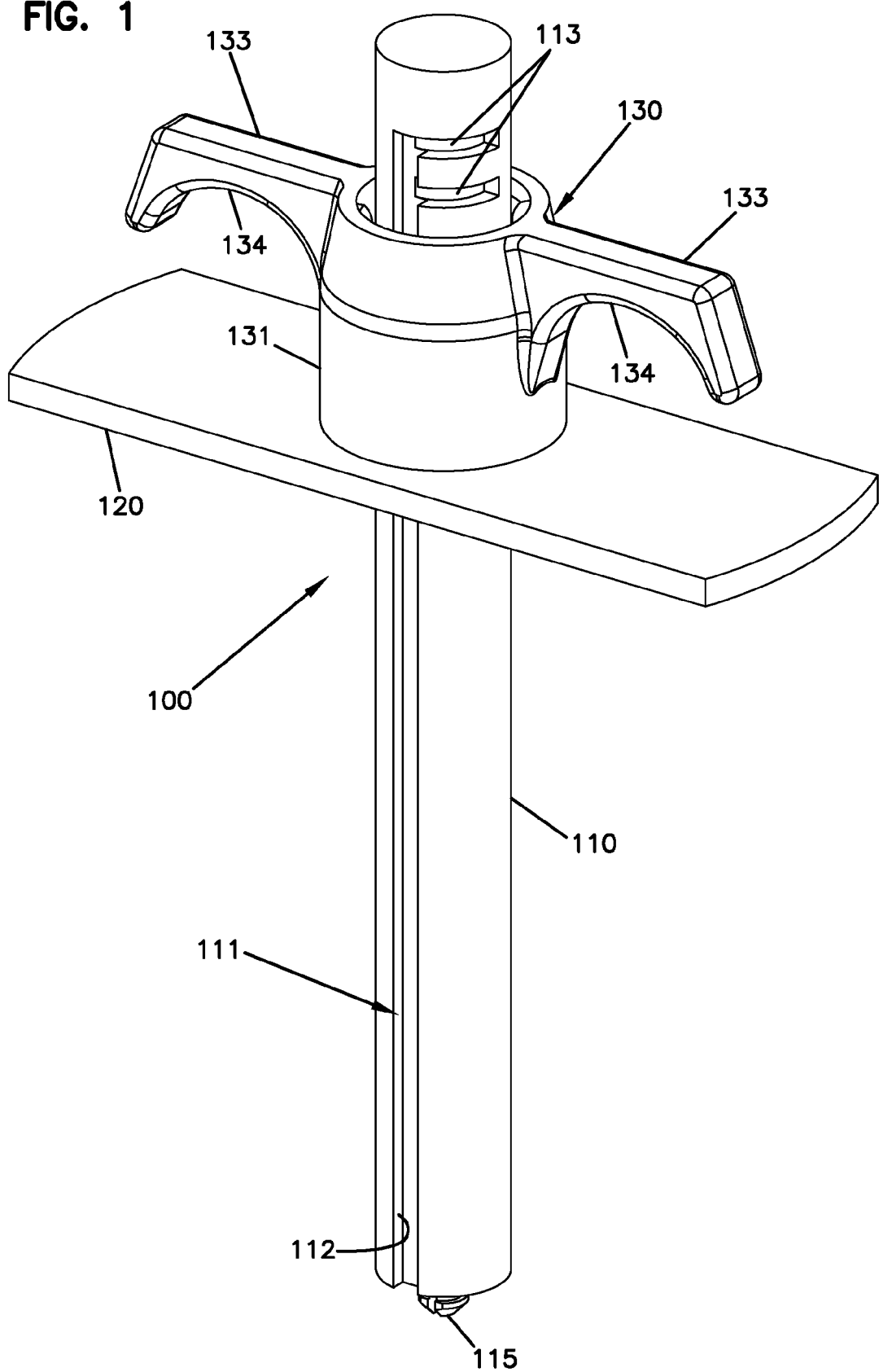
FIG. 1 is a perspective view of a first example cable manager including an elongated member, a gate member, and a locking member configured in accordance with the principles of the present disclosure.
Figure 2:
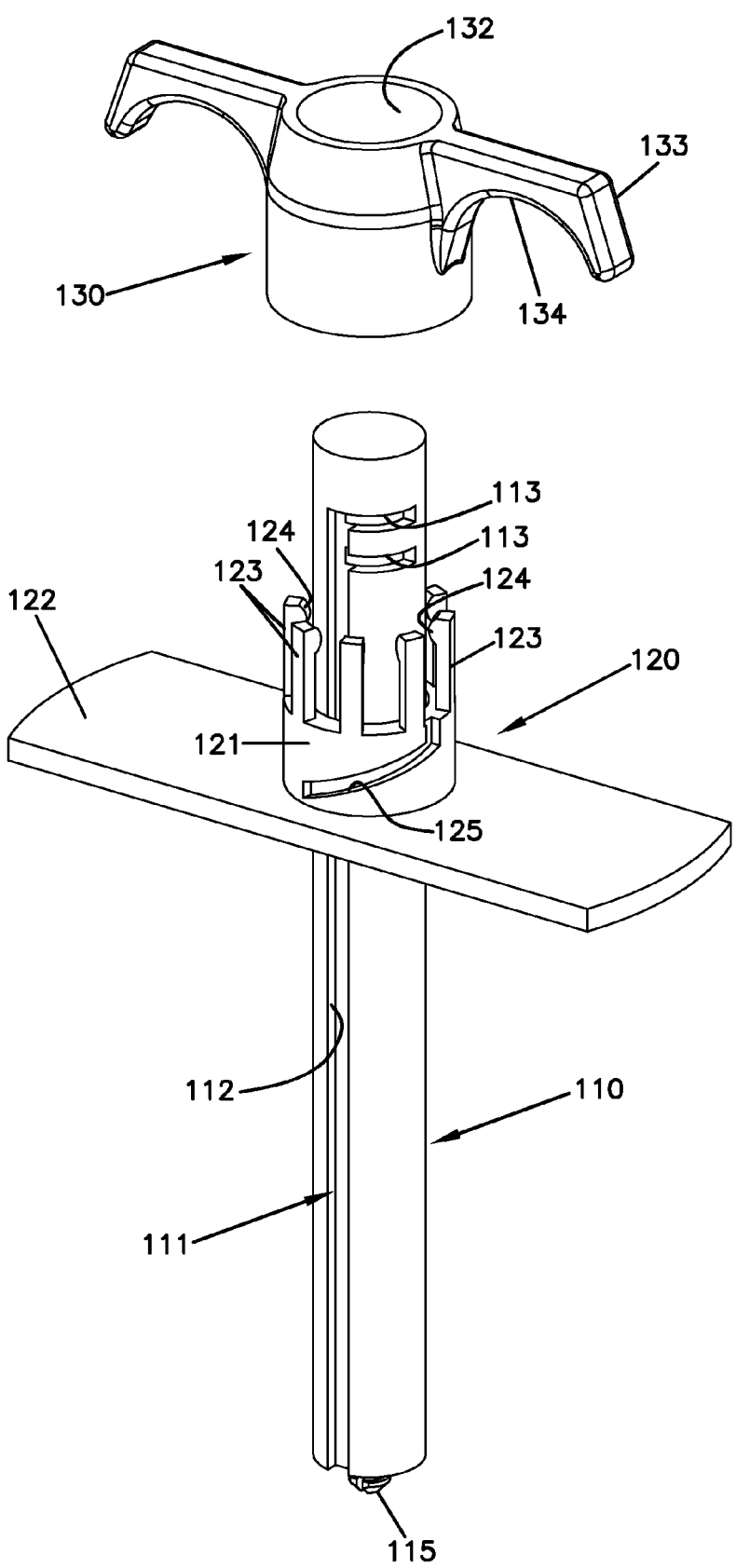
FIG. 2 shows the locking member exploded away from the first cable manager of FIG. 1.
Figure 3:
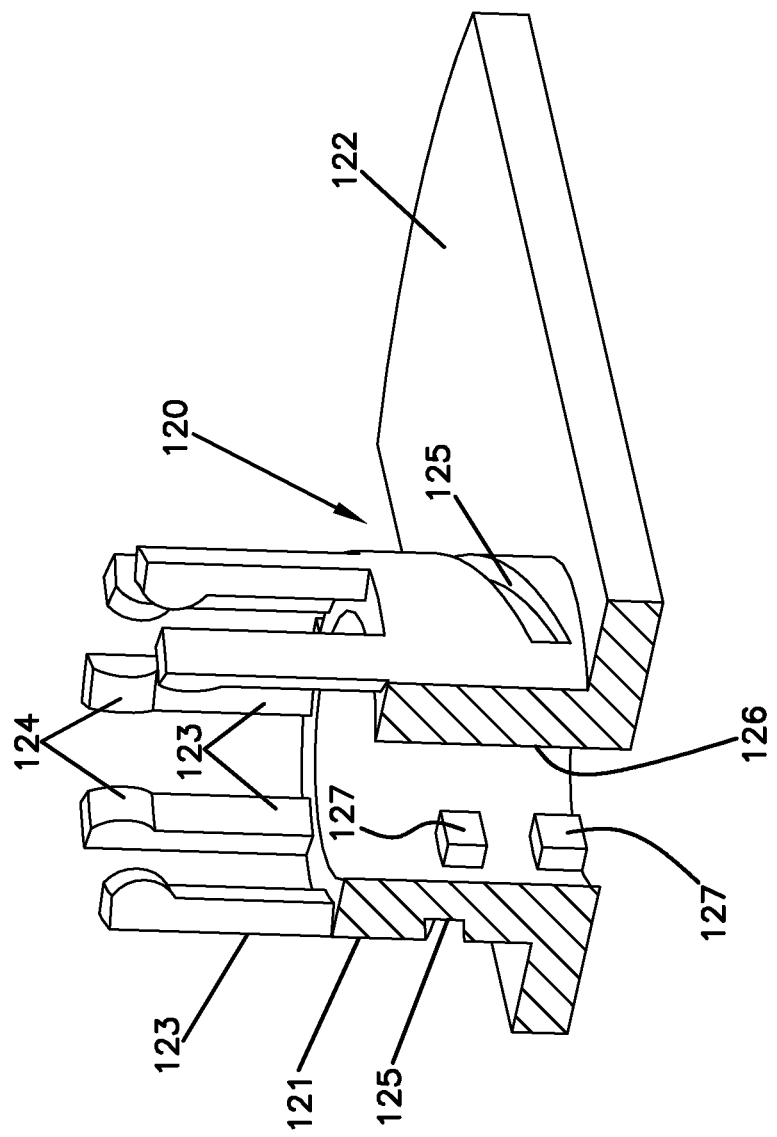
FIG. 3 is a perspective cross-sectional view of the gate member of FIG. 1.
Figure 4:
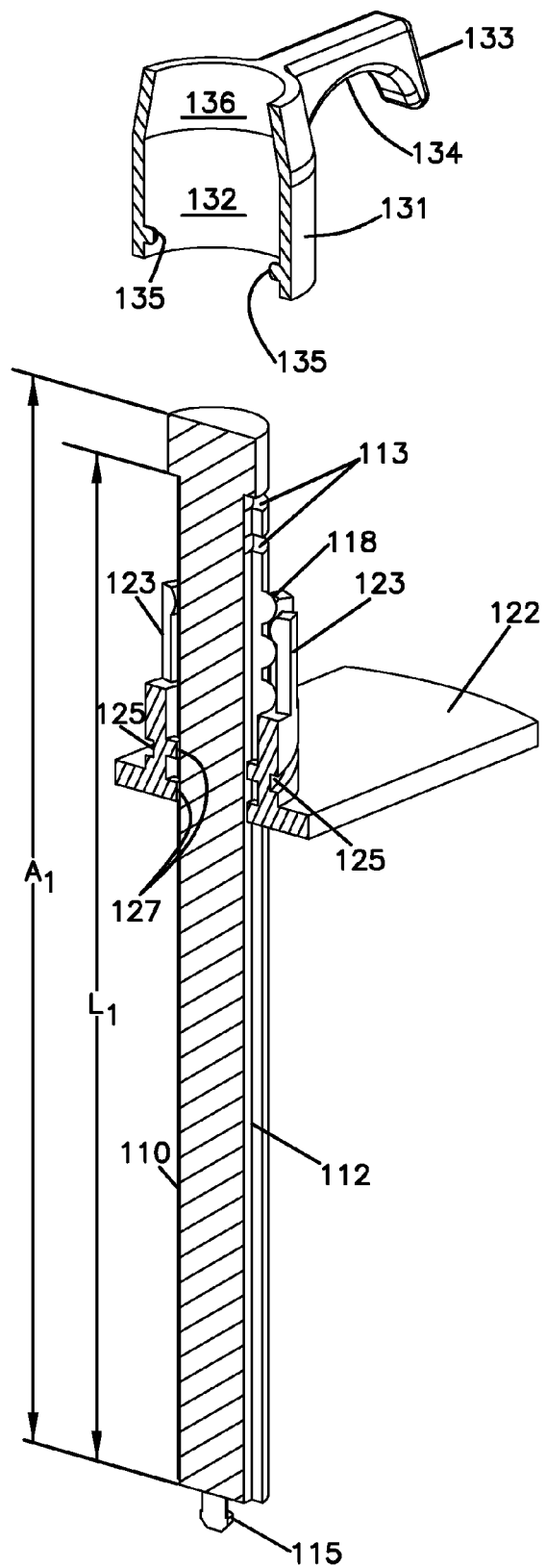
FIG. 4 is a longitudinal cross-sectional view of the first cable manager of FIG. 1.
Figure 5:
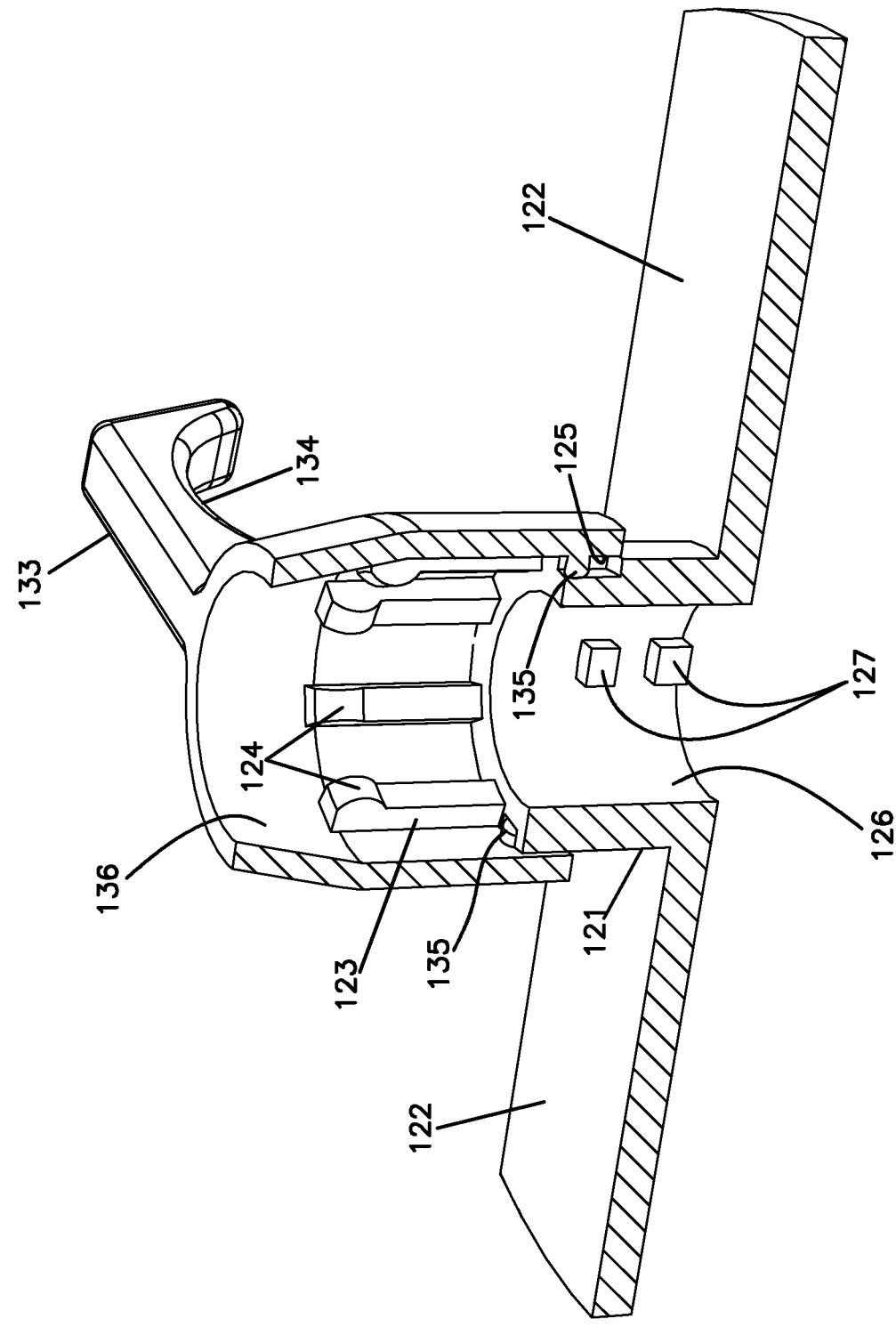
FIG. 5 is a cross-sectional view of the locking member of FIG. 1 disposed over the gate member of FIG. 1 in a deactivation position.
Figure 6:
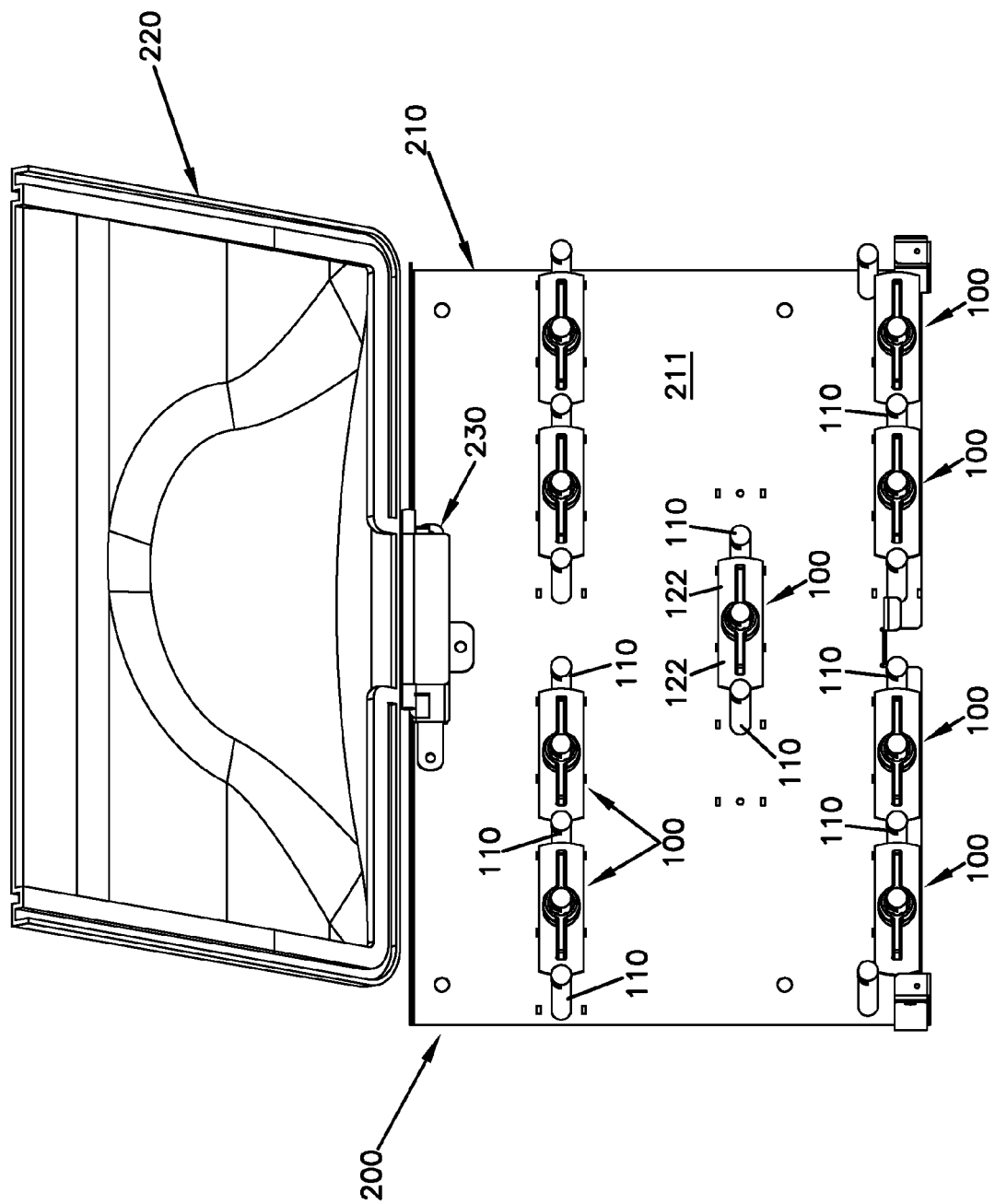
FIG. 6 is a perspective view of a cable management system in which the cable managers of FIG. 1 are deployed.
Figure 7:
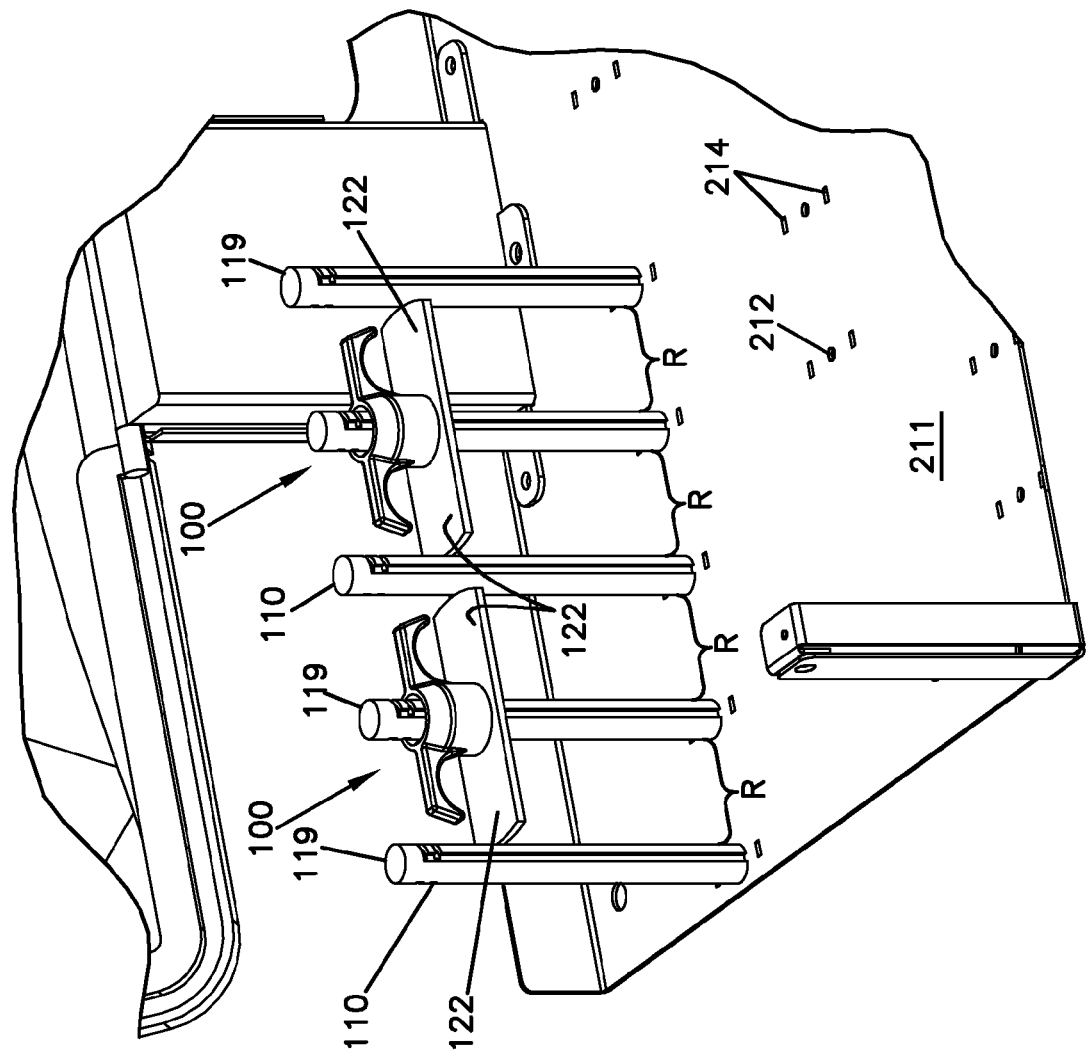
FIG. 7 is an enlarged view of a section of FIG. 6.

FIGS. 1-5 illustrate a first example cable manager 100 suitable for use in a cable management system (e.g., see FIGS. 6 and 7). The first example cable manager 100 includes an elongated member 110 and a gate member 120. The elongated member 110 extends axially along a length L1 (FIG. 4). The elongated member 110 has an adjustment region A1 (FIG. 4) that extends along a majority of the length L1. The gate member 120 is axially movable along the adjustment region A1. The elongated member 110 is configured to mount to a surface. In the example shown, the elongated member 110 includes a mounting member 115 that is configured to snap-through a mounting aperture in the surface (see FIG. 7). In other implementations, the mounting member 115 can include screw-type fasteners, rivets, heat stake or friction fit members, nuts or any other fastening mechanism.

The elongated member 110 defines a channel arrangement 111 extending along the adjustment region A1. The channel arrangement 111 includes a primary channel 112 extending axially along an exterior surface of the elongated member 110. The channel arrangement 111 also includes at least one secondary channel 113 extending outwardly from the primary channel 112 at an angle to the primary channel 112. In the example shown, the channel arrangement 111 includes two secondary channels 113 extending parallel to each other.

The gate member 120 is configured to couple to the elongated member 100. The gate member 120 includes a body 121 defining a through-passage 126 (FIG. 3) that enables the body 121 to be mounted around the elongated member 110 (see FIG. 2). At least one gate 122 extends from the body 121 transverse to the elongated member. In the example shown, two gates 122 extend from the body 121 in opposite directions. In other implementations, one or more gates 122 can extend from the body 121 in any transverse direction.

The gate member 120 is configured to translate axially along the adjustment region A of the elongated member. For example, the gate member body 121 includes at least a first rider 127 extending into the through-passage 126. The first rider 127 is configured to translate along the channel arrangement 111 of the elongated member 110. In the example shown, the gate member body 121 also includes a second rider 127 that is also configured to translate along the channel arrangement 111 of the elongated member 110.

In accordance with certain aspects of the disclosure, the channel arrangement 111 includes at least one secondary channel 113 along which the first rider 127 can translate. The secondary channel 113 extends outwardly from the primary channel 112 at an angle, thereby enable limited rotation of the gate member 120 relative to the elongated member 110. In certain implementations, the secondary channel 113 is orthogonal to the primary channel. In other implementations, the secondary channel 113 can curve around the elongated member in a partial spiral. In the example shown, the channel arrangement 111 includes two secondary channels 113 that can each receive one of the riders 127. In an example, the secondary channels extend parallel to each other.

In accordance with certain aspects of the disclosure, the gate member 120 can be releasably fixed at any point along the adjustment region A1 of the elongated member 110. The gate member 120 includes at least one stop surface 124. In some implementations, the gate member 120 includes multiple stop surfaces 124. In certain implementations, each stop surface 124 is located at a distal end of a resilient finger 123. The gate member 120 is axially fixed relative to the elongated member by pressing the stop surfaces 124 against the elongated member 110. For example, the gate member 120 can be axially fixed by friction between the stop surfaces 124 and an exterior surface of the elongated member 110. In other implementations the elongated member 110 can define retention structure (e.g., protrusions, notches, surface textures) along an exterior surface that can cooperate with the stop surfaces 124 to inhibit axial movement of the gate member 120.

In some implementations, the first example cable manager 100 includes a locking member 130 that is configured to inhibit inadvertent axial movement of the gate member 120 relative to the elongated member 110. In certain implementations, the locking member 130 is configured to actuate the stop surfaces 124 of the gate member 120 to selectively inhibit axial movement of the gate member 120 relative to the elongated member 110. The locking member 130 is configured to move relative to the gate member 120 between a first position and a second position. When in the first position, the locking member 130 allows the gate member 120 to move along the adjustment region A1 of the elongated member 110. When in the second position, the locking member 130 fixes the gate member 120 at an axial position along the adjustment region A of the elongated member 110.

In certain implementations, the locking member 130 defines a through-passage 132 that enables the locking member 130 to mount over the elongated member 110. At least a deactivation region 131 of the locking member 130 extends over the resilient fingers 123 of the gate member body 121. The locking member 130 also defines an activation region 136 that tapers radially inwardly relative to the deactivation region 131. The locking member 130 also includes handles 133 defining grip surfaces 134 to facilitate movement of the locking member between the first and second positions.

When the locking member 130 is disposed in the first position, the stop surfaces 124 of the gate member body 121 are disposed within the deactivation region 131 of the locking member 130 (see FIG. 5). The deactivation region 131 has a sufficient cross-dimension to avoid pressing the stop surfaces 124 against the elongated member 110. Accordingly, the gate member 120 is freely movable along the elongated member 110. When the locking member 130 is disposed in the second position, the stop surfaces 124 of the gate member body 121 are disposed within the activation region 136 of the locking member 130. The tapered surface of the activation region 136 presses the stop surfaces 124 towards the elongated member 110 to axially fix the gate member 120 relative to the elongated member 110.

As noted above, some implementations of the elongated member 110 include retention structures. In such implementations, the tapered surface of the activation region 136 presses the stop surfaces 124 against the retention structures to axially fix the gate member 120. In certain implementations, the retention structures can be positioned along the elongated member 110 at predetermined intervals that inhibit over-tightening of the gate member 120 against the cables.

In some implementations, the gate member 120 and the locking member 130 cooperate to limit the movement of the locking member 130 relative to the gate member 120. For example, in certain implementations, the gate member body 121 defines one or more exterior tracks 125 in which internal lugs 135 of the locking member 130 ride. In the example shown, the gate member 120 includes two exterior tracks 125 and the locking member 130 includes to lugs 135 that ride in the tracks 125. Movement of the locking member 130 relative to the gate member 120 is limited by the length of the exterior tracks 125. In other implementations, the gate member 120 can include one or more exterior lugs and the locking member 130 can define one or more internal tracks.

In some implementations, the exterior tracks 125 extend generally parallel to the elongated member 110. In such implementations, the locking member 130 moves axially between the first and second positions. In other implementations, the exterior tracks 125 spiral or otherwise contour at least partially around the gate member body 121. In such implementations, the locking member 130 rotates between the first and second positions instead of or in addition to moving axially. In an example, the locking member 130 rotates generally orthogonally between the first and second positions. In another example, the locking member 130 otherwise rotates between the first and second positions. In other examples, the locking member 130 can rotate any desired amount (e.g., about 30°, about 40°, about 45° about 50°, about 60°, about 70°, about 80°, about 90°, about 100°, about 110°, about 120°, about 130°).

FIGS. 6 and 7 illustrate an example cable management system 200 in which the cable manager 100 can be deployed. The cable management system 200 includes a panel 210 to which one or more cable managers 100 are mounted so that elongated members 110 of the cable managers 100 extend from a panel surface 211 to distal ends 119. The cable managers 100 at least partially define one or more cable management regions R at which cables (e.g., optical cables, electrical cables, etc.) can be stored. The gates 122 of the cable managers 100 selectively retain the cables within the management regions R.

In some implementations, the panel 210 is mounted horizontally so that the cables lay across the panel surface 211. In other implementations, however, the panel 210 can be mounted vertically so that the cables hang parallel to the panel surface 211. In certain implementations, the cable management system 200 also includes a cover 220 coupled to the panel 210. In the example shown, the cover 220 is pivotally mounted to the panel 210 to move between a covering position, in which the cover 220 extends over the distal ends 119 of the cable managers 100 to inhibit access thereto, and an access position, in which the cover 220 allows access to the cable managers 100 (e.g., see FIG. 6).

In some implementations, the panel 210 defines one or more mounting apertures through the panel surface 211. In certain implementations, the same panel 210 can define different types of mounting apertures. In the example shown, the panel 210 defines rounded apertures 212 disposed between rectangular apertures 214. In other implementations, the panel 210 can define apertures of any desired shape and configuration. In the example shown, the mounting member 115 of each cable manager 100 is snap fit within one of the rounded apertures 212 defined in the panel 210.

In some implementations, the cable managers 100 can be disposed between ungated elongated members 110, flanges, or other structures extending outwardly from the panel surface 211. The elongated members 110 of the cable managers 100 cooperate with the ungated elongated members 110 (or other structures) to define the cable management regions R therebetween. The distal ends 119 of the elongated members 110 (both gated and ungated) bound the entrances to the cable management regions R. The gates 122 of the gate members 120 are configured to inhibit access to the cable management regions R by extending across the entrances to the cable management regions R. In other implementations, the cable managers 100 can be disposed adjacent to each other to define the cable management regions R therebetween.

Certain types of gate members 120 including gates 122 having major surfaces that extend parallel to the panel 210 (see FIG. 7). The major surfaces of the gates 122 of other types of gate members 120 can extend transverse to the panel 210 and transverse to the elongated members 110. Such gate members 120 can be positioned at outer boundaries of the panel 210 (i.e., or a management region of the panel 210) to bound some of the cable management regions R.

When the gate members 120 are disposed in the open positions, the gate(s) 122 are positioned to allow access to the respective cable management region(s) R. Accordingly, one or more cables can be added to, removed from, and/or repositioned within the cable management region(s) R. When the gate members 120 are disposed in the closed positions, the gate(s) 122 are positioned to extend across the respective cable management region(s) R to inhibit access to the cable management region(s) R. Accordingly, the gates 122 aid in maintaining the cables within the cable management regions R.

When the locking member 130 of a cable manager 100 is disposed in the first position, the gate member 120 is movable along the elongated member 110 to increase or decrease the size (e.g., depth) of the respective cable management region(s) R. For example, the user can grasp the handles 133 at the grip surfaces 134 to pull and/or push the gate member 120 along the adjustment region A1 of the elongated member 110. When the locking member 130 of a cable manager 100 is disposed in the second position, the gate member 120 is axially fixed relative to the elongated member 110. The locking member 130 enables the depth of the cable management region R to be adjusted to accommodate the number/size of the cables occupying the cable management region R. The locking member 130 also enables the gate member 120 to retain the cables within the cable management region R against normal pull applied to the cables during use of the surrounding equipment.

Figure 9:
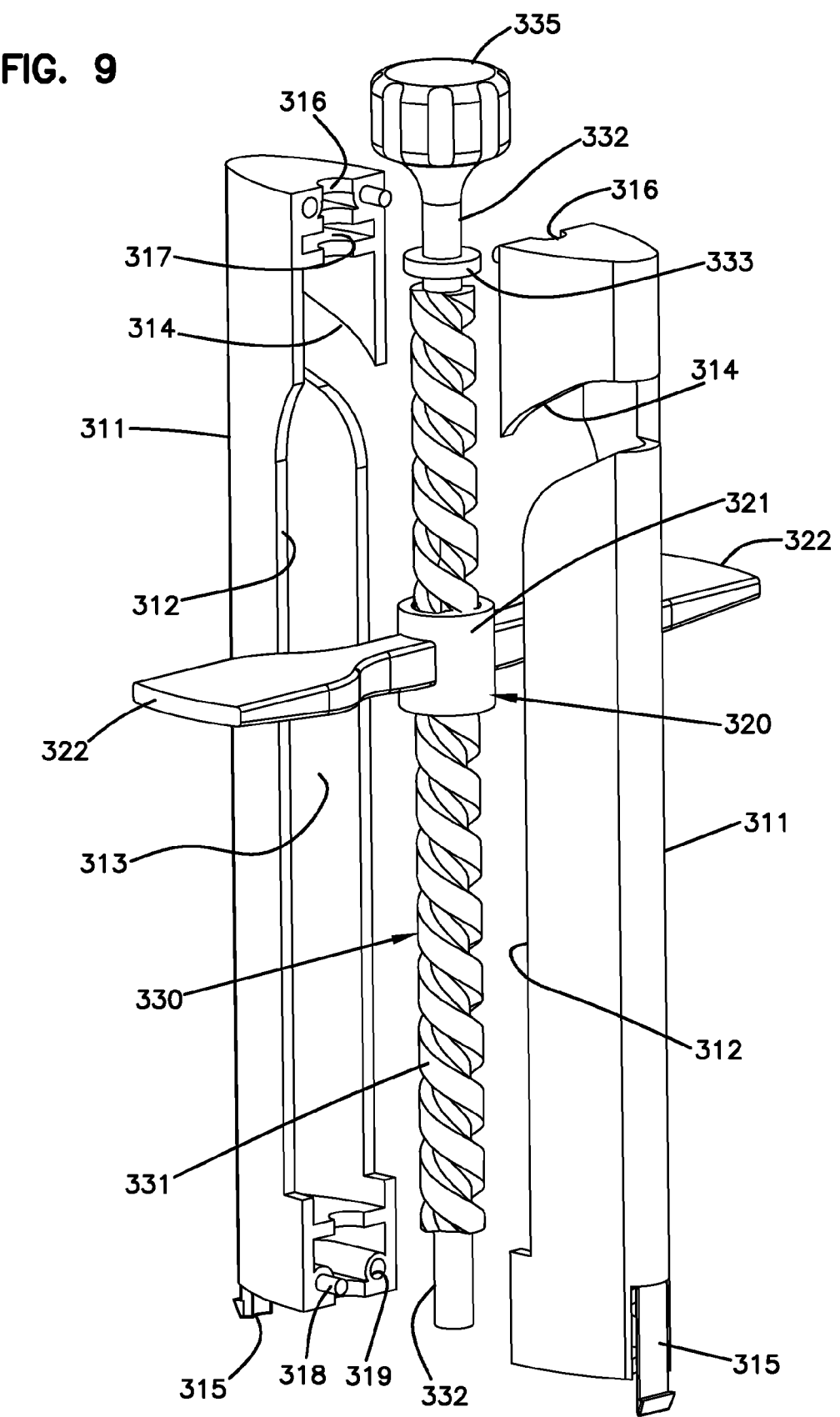
FIG. 9 is an exploded view of the second cable manager of FIG. 8.
Figure 10:
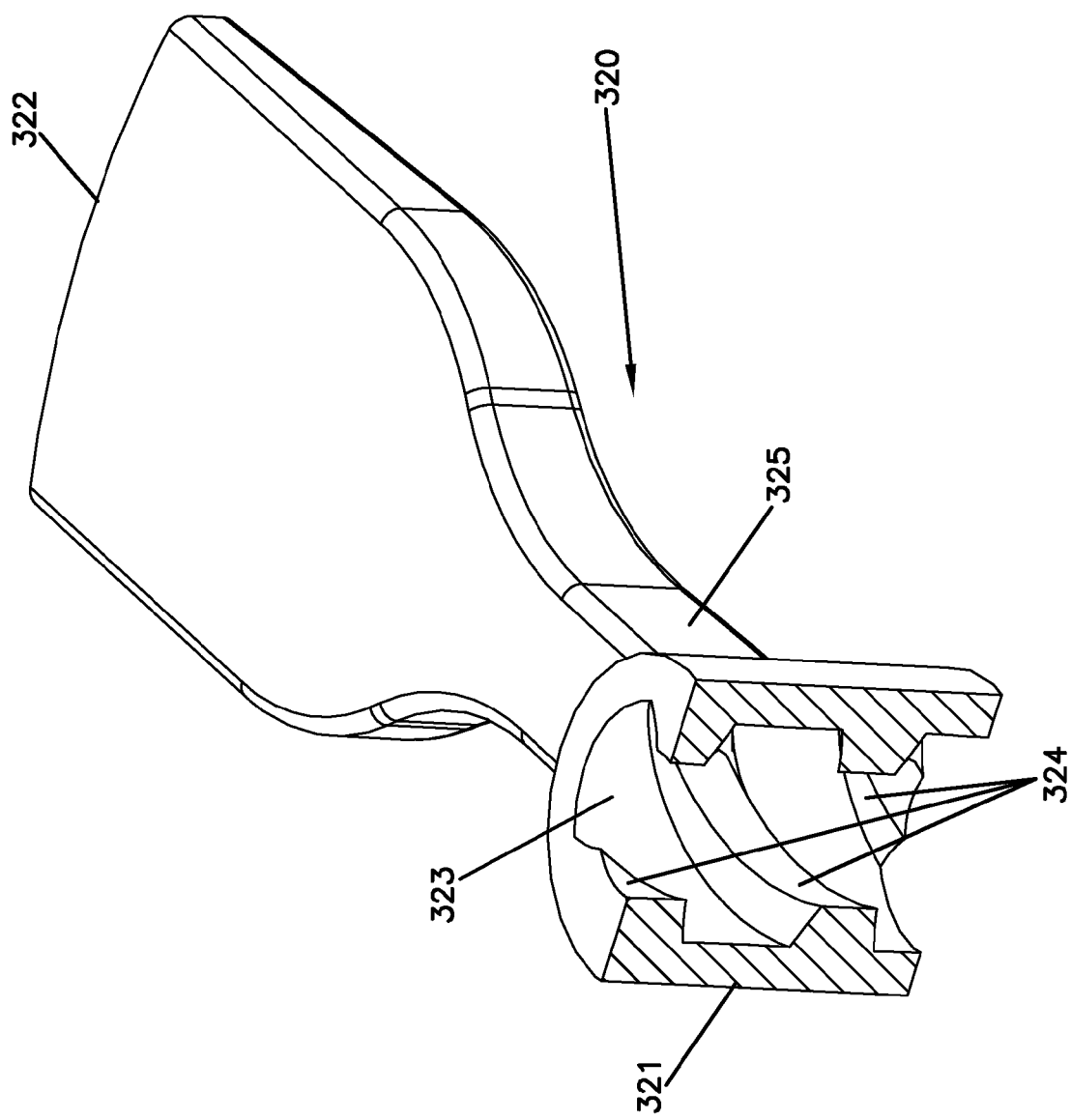
FIG. 10 is a perspective cross-sectional view of the gate member of FIG. 8.
Figure 11:
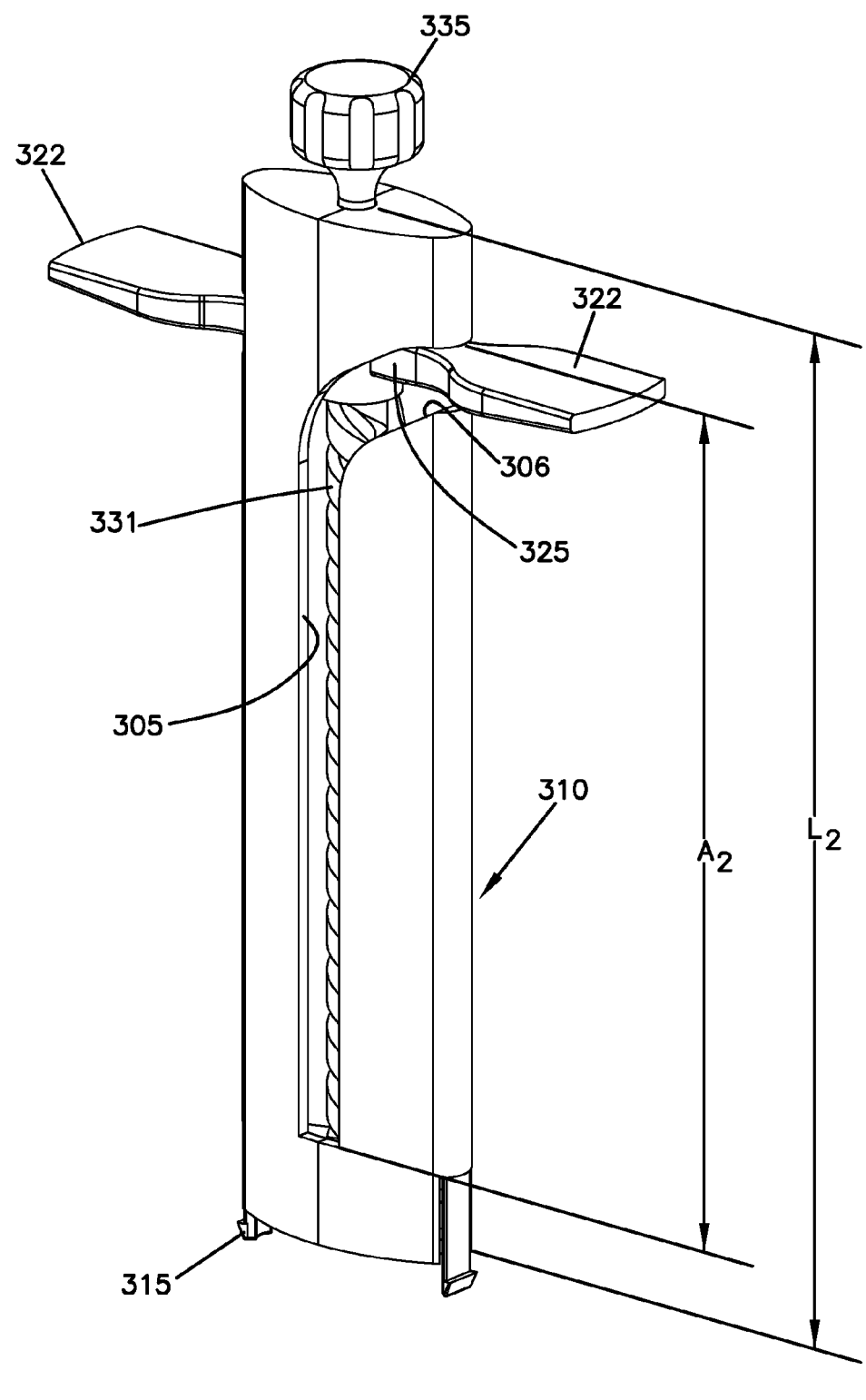
FIG. 11 is a perspective view of the second cable manager of FIG. 8 with the gate member rotated into a deviation section of a track defined by the elongated member.
Figure 12:
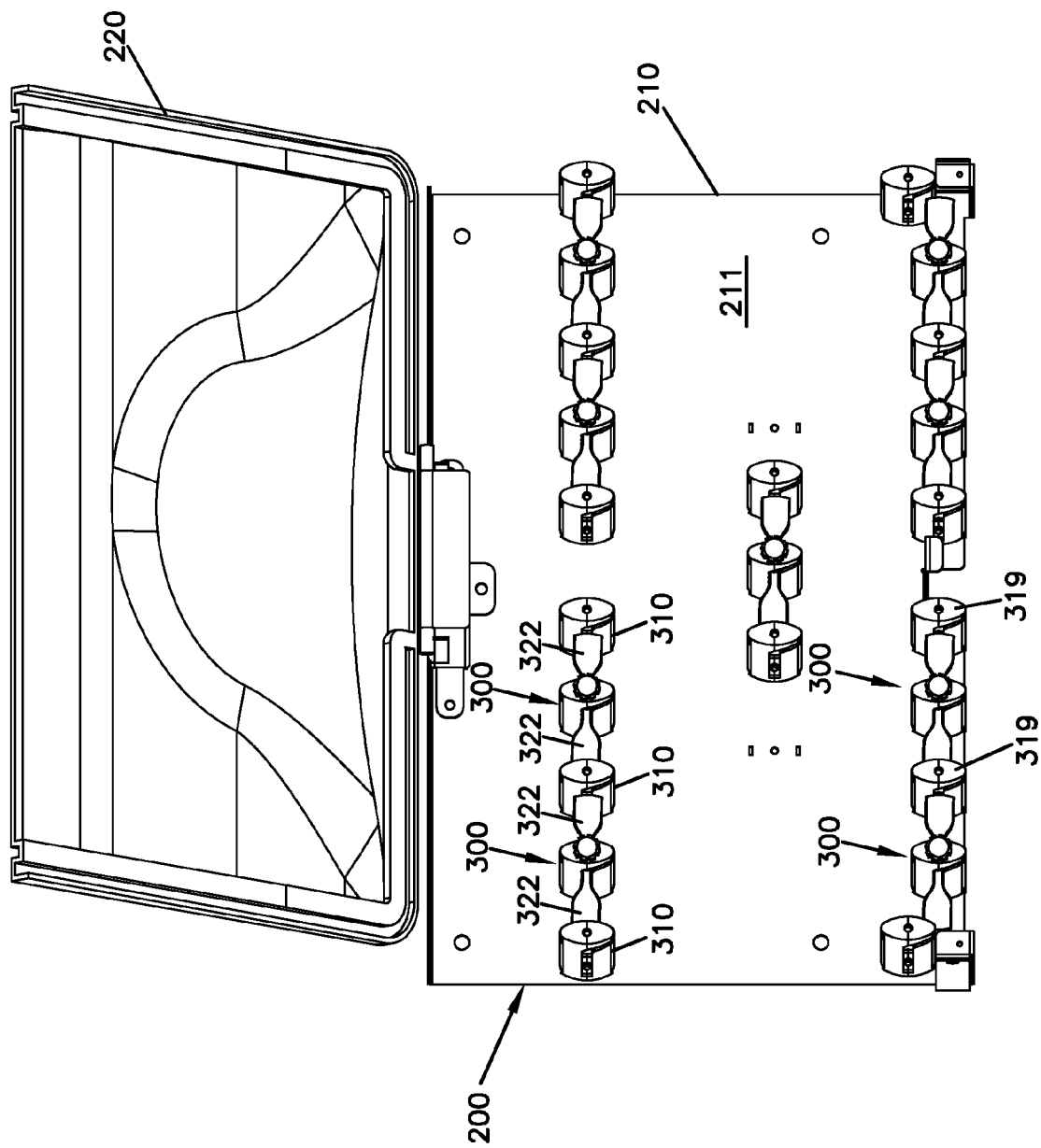
FIG. 12 is a perspective view of the cable management system of FIG. 6 in which the cable managers of FIG. 8 are deployed.
Figure 13:
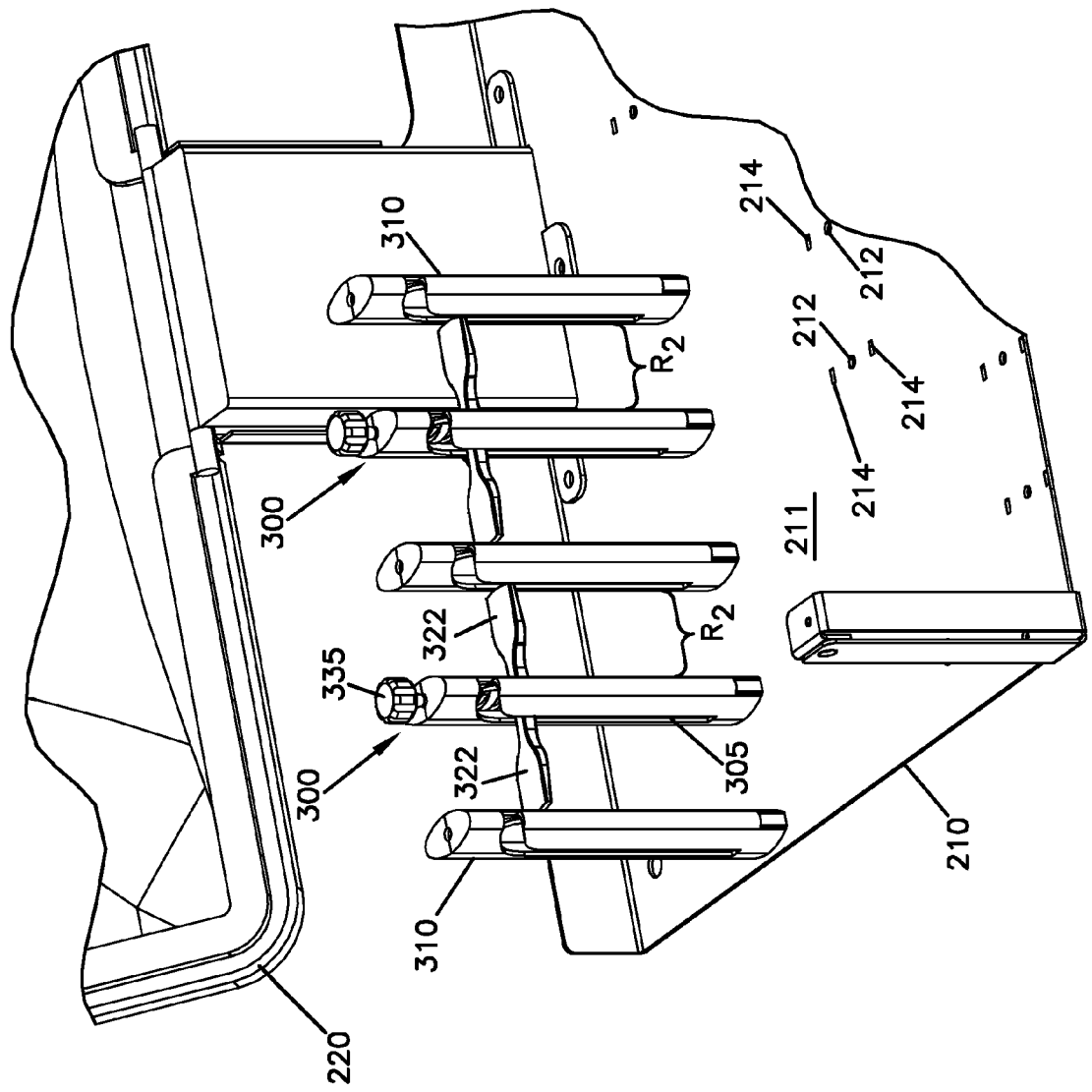
FIG. 13 is an enlarged view of a section of FIG. 12.

FIGS. 8-11 illustrate a second example cable manager 300 suitable for use in a cable management system (e.g., see FIGS. 12 and 13). The second example cable manager 300 includes an elongated member 310, a gate member 320, and a mounting rod 330. The elongated member 310 extends axially along a length L2 (FIG. 11). The elongated member 310 has an adjustment region A2 (FIG. 11) that extends along a majority of the length L2. The gate 320 is axially movable along the adjustment region A2 relative to the elongated member 310 and the mounting rod 330.

The elongated member 310 is configured to house the mounting rod 330 so that the mounting rod 330 extends along the length L2 of the elongated member 310. The elongated member 310 defines one or more tracks 305 extending along the adjustment region A2. Each track 305 has a deviation section 306 at one end that angles or curves away from the rest of the track 305. The gate member 320 is coupled to the mounting rod 330 and has gates 322 that extend out through the track 305 of the elongated member 310. The gates 322 follow the track 305 as the gate member 320 is moved relative to the elongated member 310. The elongated member 310 includes one or more mounting members 315 that are configured to snap-through mounting apertures in a surface. In the example shown, the elongated member 310 includes latching arms 315.

Figure 8:
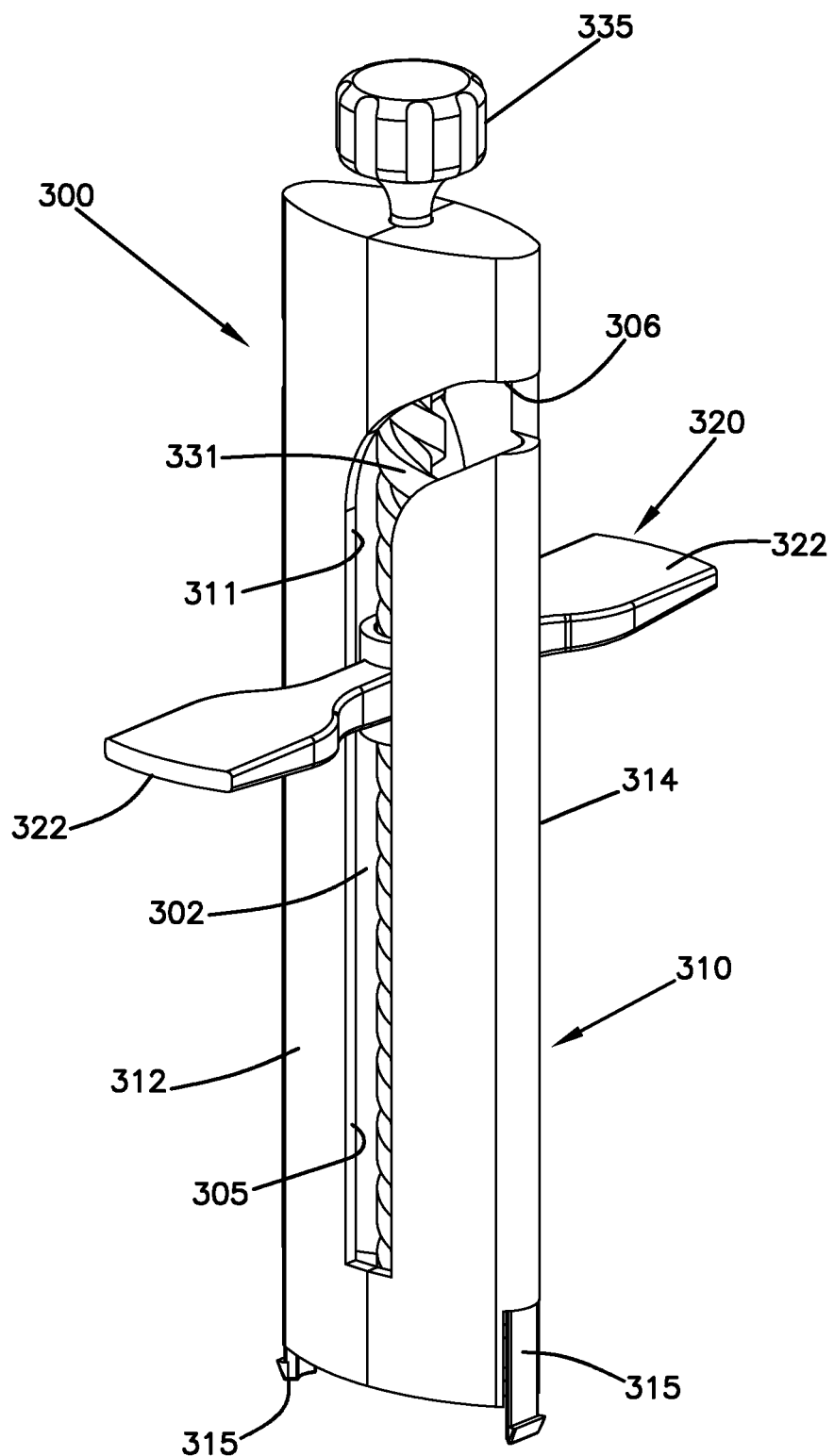
FIG. 8 is a perspective view of a second example cable manager including an elongated member, a gate member, and a mounting rod configured in accordance with the principles of the present disclosure.

As shown in FIG. 9, the elongated member 310 includes two housing parts 311 that each define a hollow interior 313 bounded by edges 312 of the housing parts 311. When the housing parts 311 are assembled, the hollow interiors 313 join to form a cavity 302 (FIG. 8). In the example shown, the housing parts 311 are identical to each other. In other implementations, two different housing parts can be coupled together to form the elongated member 310. In some implementations, the housing parts 311 are coupled together using a pin and hole arrangement. In the example shown, each housing part 311 includes two pins 318 that align with two holes 319 in the other housing part 311. In other implementations, the housing parts 311 may otherwise be held together.

In the example shown, facing edges 312 of the housing parts 311 define the track 305 when the housing parts 311 are assembled together. Each housing part 311 forms the deviation section 306 of one of the tracks 305. The housing parts 311 define structures to accommodate the mounting rod 330. At least one end of the housing parts 311 defines a notch 316 that cooperates with the notch 316 of the other housing part 311 to define an aperture through which a portion of the mounting rod 330 extends out of the elongated member 310. In the example shown, one end of each housing part 311 also defines an internal shelf 317 that aligns with the internal shelf 317 of the other housing part 311.

The mounting rod 330 includes a threaded section 331, one or more mounting sections 332 (e.g., at opposite ends of the threaded section 331), and a handle 335 at one end of the mounting rod 330. The mounting sections 332 extend through apertures defined by the notches 316 so that the handle 335 is disposed external of the elongated member 310. The mounting rod 330 also includes an annular flange 333 at one or both of the mounting sections 332. The annular flange 333 is configured to seat on the internal shelves 317 of the elongated member 310. The threaded section 331 extends within an interior of the elongated member 310.

The gate member 320 mounts to the threaded section 331 of the mounting rod 330. As shown in FIG. 10, the gate member 320 includes a body 321 defining a through-passage 323 through which the mounting rod 330 extends. The body 321 can have internal threads 324 disposed within the through-passage 323 to enable the gate member 320 to ride along the threaded section 331 of the mounting rod 330. One or more gates 322 extend outwardly from the body 321. In the example shown in FIGS. 8 and 9, the gate member 320 includes two gates 322 extending in opposite directions. In certain implementations, the gates 322 define narrow sections 325 that extend through the track 305 of the elongated member 310.

In use, a user twists the handle 335 of the mounting rod 330 relative to the elongated member 310 to turn the threaded section 331 of the mounting rod 330. Turning the threaded section 331 initially turns the gate member 320. The gates 322 (e.g., the narrow portions 325) abut the edges of the track 305 (i.e., the facing edges 312 of the housing parts 311), which causes the gate member 320 to remain rotationally stationary while the threaded section 331 of the mounting rod 330 rotates. Continued rotation of the threaded section 331 while the gate member 320 is held rotationally stationary causes axial movement of the gate member 320 relative to the threaded section 331. Accordingly, the gates 322 travel along the tracks 305 defined in the elongated member 310 when the user twists the handle 335.

Upon reaching the deviation sections 306 of the tracks 305, the gates 322 are no longer retained by the facing edges 312 of the housing parts 311 of the elongated member 310. Continuing to rotate the handle 335 causes the gate member 320 to rotate with the mounting rod 330 through the deviation section 306 of the track 305. In the example shown, the gates 322 move about 90° as they follow the deviation section 306. In other implementations, the gates 322 can move a greater or lesser amount. In the example shown, the deviation section 306 is located at one end of the abutment region A2. In other implementations, one or more deviation sections 306 can be located at other locations along the track 305.

In some implementations, the mounting rod 330 can cooperate with the elongated member 310 to lock the gate member 320 at an axial position along the adjustment region A2. In some implementations, the mounting rod 330 can be axially movable relative to the elongated member 310 over a limited distance. When the mounting rod 330 is disposed in a first axial position relative to the elongated member 310, the threaded rod 330 is allowed to rotate relative to the elongated member 310. When the mounting rod 330 is disposed in a second axial position relative to the elongated member 310, the threaded rod 330 is inhibited from rotating relative to the elongated member 310. For example, the mounting rod 330 can include a stop flange or other structure and the elongated member 310 can define an inner cavity or shoulder that engage when transversely aligned or unaligned.

FIGS. 12 and 13 illustrate the cable managers 300 deployed in the cable management system 200 described above with respect to FIGS. 6 and 7. The elongated members 310 of the cable managers 300 extend from a panel surface 211. In the example shown, the two latching arms 315 of each elongated member attach to the rectangular mounting apertures 214 defined in the panel surface 211. In other implementations, the managers 300 may be otherwise mounted to the panel 210. The cable managers 300 at least partially define one or more cable management regions R2 at which cables (e.g., optical cables, electrical cables, etc.) can be stored. The gates 322 of the cable managers 300 selectively retain the cables within the management regions R2.

In some implementations, the cable managers 300 can be disposed between ungated elongated members 310, flanges, or other structures extending outwardly from the panel surface 211. The elongated members 310 of the cable managers 300 cooperate with the ungated elongated members 310 (or other structures) to define the cable management regions R2 therebetween. The distal ends of the elongated members 310 (both gated and ungated) bound the entrances to the cable management regions R2. The gates 322 of the gate members 320 are configured to inhibit access to the cable management regions R2 by extending across the entrances to the cable management regions R2. In other implementations, the cable managers 300 can be disposed adjacent to each other to define the cable management regions R2 therebetween.

Certain types of gate members 320 include gates 322 having major surfaces that extend parallel to the panel 210 (see FIG. 13). The major surfaces of the gates 322 of other types of gate members 320 can extend transverse to the panel 210 and transverse to the elongated members 310. Such gate members 320 can be positioned at outer boundaries of the panel 210 (i.e., or a management region of the panel 210) to bound some of the cable management regions R2.

When the gate members 320 are disposed in the open positions, the gate(s) 322 are positioned to allow access to the respective cable management region(s) R2. Accordingly, one or more cables can be added to, removed from, and/or repositioned within the cable management region(s) R2. When the gate members 320 are disposed in the closed positions, the gate(s) 322 are positioned to extend across the respective cable management region(s) R2 to inhibit access to the cable management region(s) R2. Accordingly, the gates 322 aid in maintaining the cables within the cable management regions R2.

Figure 14:
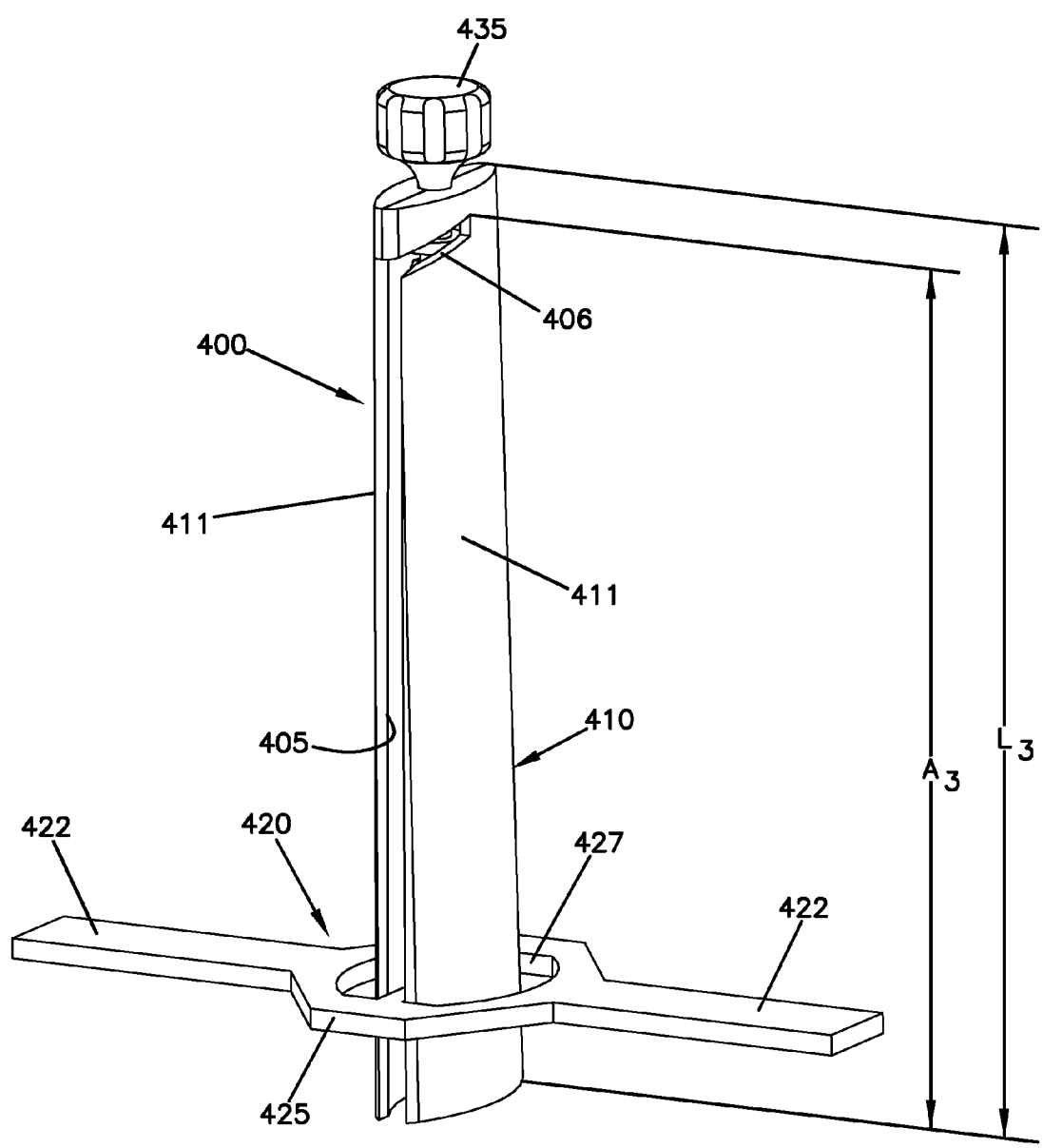
FIG. 14 is a perspective view of a third example cable manager including an elongated member, a gate member, and a mounting rod configured in accordance with the principles of the present disclosure.
Figure 15:
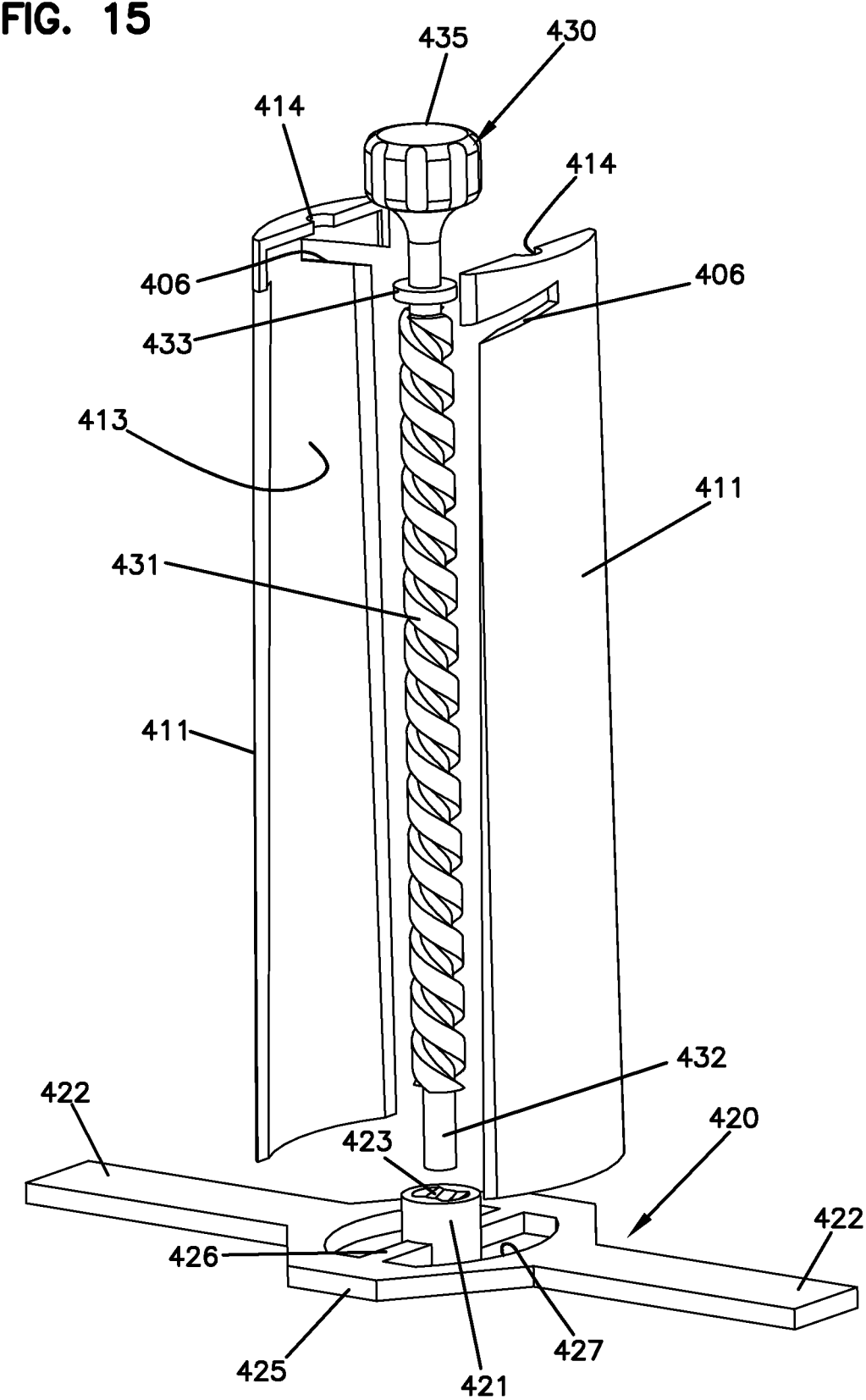
FIG. 15 is an exploded view of the third cable manager of FIG. 14.

FIGS. 14 and 15 illustrate a third example cable manager 400 suitable for use in a cable management system, such as management system 200 described herein. The third example cable manager 400 includes an elongated member 410, a gate member 420, and a mounting rod 430 (FIG. 15). The elongated member 410 extends axially along a length L3 (FIG. 14). The elongated member 410 has an adjustment region A3 (FIG. 14) that extends along a majority of the length L3. The gate 420 is axially movable along the adjustment region A3 relative to the elongated member 410 and the mounting rod 430.

The elongated member 410 is configured to house the mounting rod 430 so that the mounting rod 430 extends along the length L3 of the elongated member 410. The elongated member 410 defines one or more tracks 405 extending along the adjustment region A3. Each track 405 has a deviation section 406 at one end that angles or curves away from the rest of the track 405. The gate member 420 is coupled to the mounting rod 430 and has gates 422 that extend out through the track 405 of the elongated member 410. The gates 422 follow the track 405 as the gate member 420 is moved relative to the elongated member 410. The elongated member 410 includes one or more mounting members (e.g., latching arms) that are configured to connect to a panel.

As shown in FIG. 15, the elongated member 410 includes two housing parts 411 that each define a hollow interior 413. When the housing parts 411 are assembled, the hollow interiors 413 join to form a cavity in which the mounting rod 330 is disposed. In the example shown, the housing parts 411 are identical to each other. In other implementations, two different housing parts can be coupled together to form the elongated member 410. In some implementations, the housing parts 411 are coupled together using a pin and hole arrangement. In other implementations, the housing parts 411 may otherwise be held together.

In the example shown, sides of the housing parts 411 define the track 405 when the housing parts 411 are assembled together. Each housing part 411 forms the deviation section 406 of one of the tracks 405. The housing parts 411 define structures to accommodate the mounting rod 430. At least one end of the housing parts 411 defines a notch 414 that cooperates with the notch 414 of the other housing part 411 to define an aperture through which a portion of the mounting rod 430 extends out of the elongated member 410. In certain implementations, one or both housing parts 411 also define an internal shelf.

The mounting rod 430 includes a threaded section 431, one or more mounting sections 432 (e.g., at opposite ends of the threaded section 431), and a handle 435 at one end of the mounting rod 430. The threaded section 431 extends within an interior of the elongated member 410. The mounting sections 432 extend through apertures defined by the notches 414 so that the handle 435 is disposed external of the elongated member 410. Certain types of mounting rods 430 also include annular flanges 433 at one or both ends of the mounting sections 432. The annular flange 433 is configured to seat on the internal shelves of the elongated member 410.

The gate member 420 mounts to the threaded section 431 of the mounting rod 430. The gate member 420 includes a body 421 defining a through-passage 423 through which the mounting rod 430 extends. The body 421 can have internal threads disposed within the through-passage 423 to enable the gate member 420 to ride along the threaded section 431 of the mounting rod 430. The body 421 is coupled to a frame 425 from which the gates 422 extend outwardly. The frame 425 is sized to extend around the elongated member 410. The frame 425 defines openings 427 through which the parts 411 of the elongated member 410 extend. The frame 425 includes connecting members 426 that extend from the frame 425, through the tracks 405 of the elongated member 410, to the housing 421 of the gate member 420 (see FIG. 14).

In use, a user twists the handle 435 of the mounting rod 430 relative to the elongated member 410 to turn the threaded section 431 of the mounting rod 430. Turning the threaded section 431 initially turns the gate member 420. The gates 422 abut the edges of the track 405, which causes the gate member 420 to remain rotationally stationary while the threaded section 431 of the mounting rod 430 rotates. Continued rotation of the threaded section 431 while the gate member 420 is held rotationally stationary causes axial movement of the gate member 420 along the threaded section 431. Accordingly, the gates 422 travel along the tracks 405 defined in the elongated member 410 when the user twists the handle 435.

Upon reaching the deviation sections 406 of the tracks 405, the gates 422 are no longer retained by the edges of the housing parts 411 of the elongated member 410. Continuing to rotate the handle 435 causes the gate member 420 to rotate with the mounting rod 430 through the deviation section 406 of the track 405. In the example shown, the gates 422 move about 90° as they follow the deviation section 406. In other implementations, the gates 422 can move a greater or lesser amount. In the example shown, the deviation section 406 is located at one end of the abutment region A3. In other implementations, one or more deviation sections 406 can be located at other locations along the track 405. In some implementations, the mounting rod 430 can cooperate with the elongated member 410 to lock the gate member 420 at an axial position along the adjustment region A3.

Figure 16:
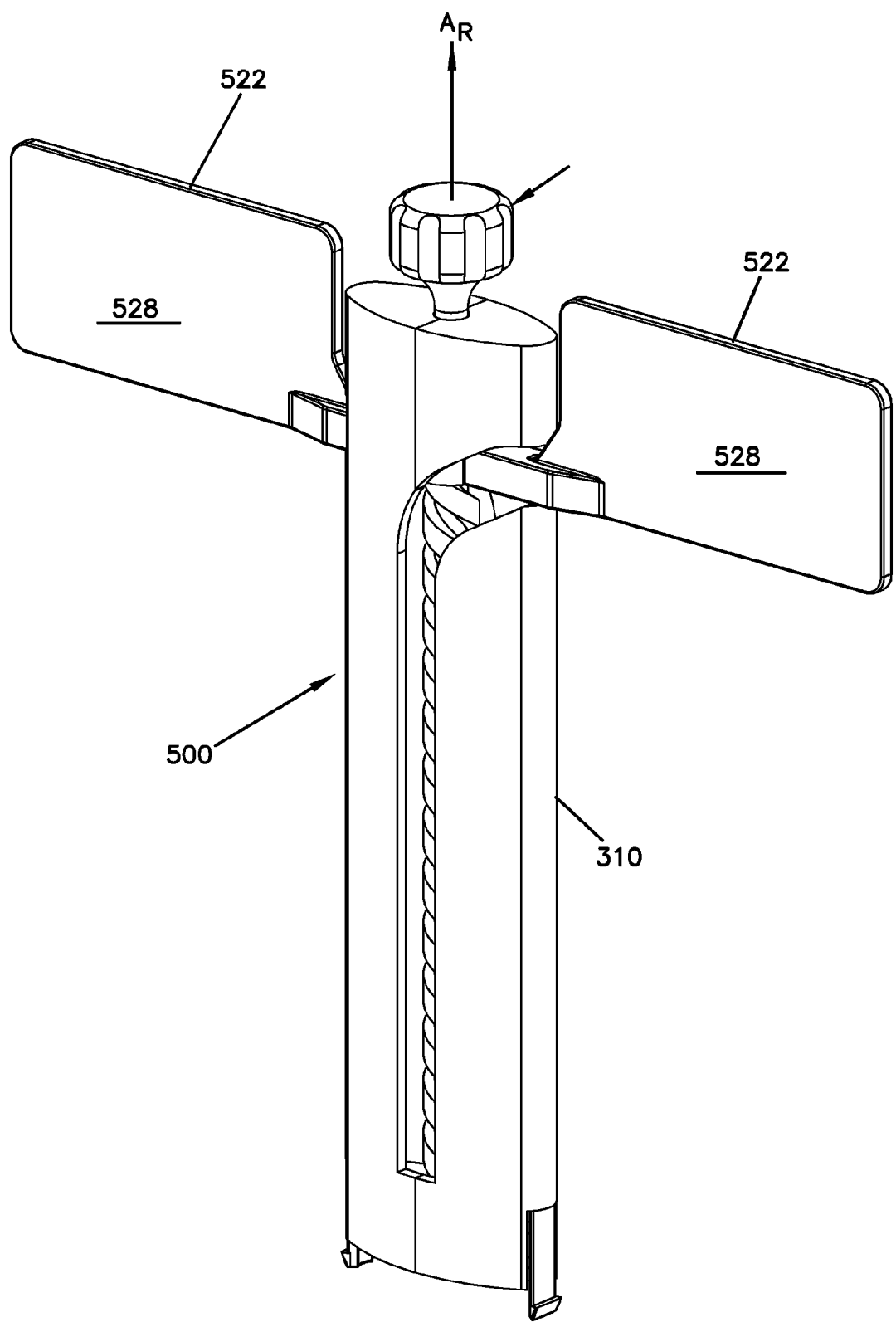
FIG. 16 is a perspective view of another example cable manager including gates having major surfaces extending parallel to a rotation axis of the gates.
Figure 17:
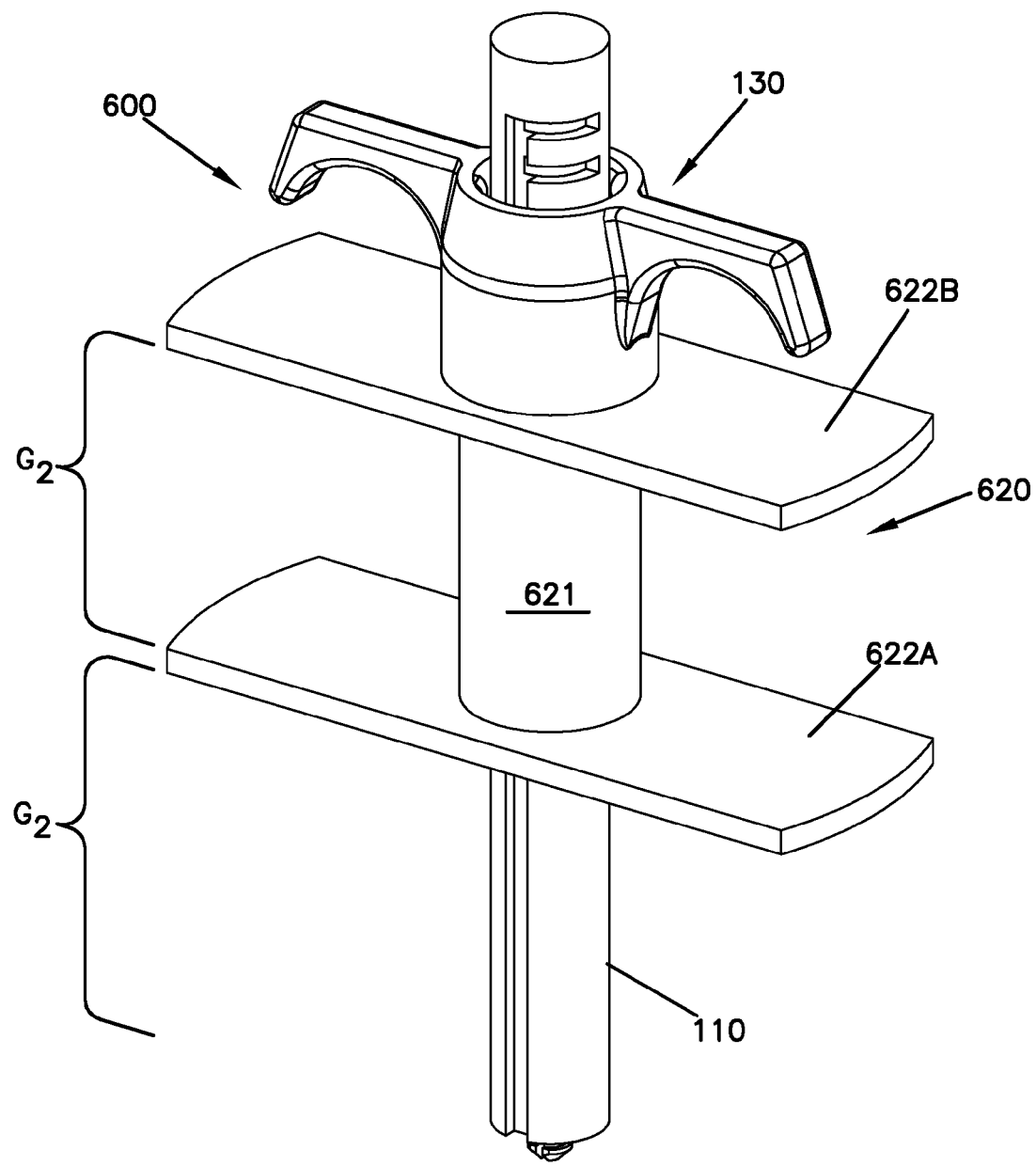
FIG. 17 is a perspective view of another example cable manager including a gate member having axially spaced sets of gates.

FIGS. 16 and 17 illustrate some design variations that can apply to any of the cable managers 100, 300, 400 described herein. For example, the gates 122, 322, 422 can be oriented so that major surfaces of the gates 122, 322, 422 extend non-parallel to the panel 200 as will be discussed with reference to FIG. 16. In other examples, each gate member 120, 320, 420 can have multiple sets of gates 122, 322, 422 that are axially spaced along the respective elongated member 110, 310, 410 as will be discussed with reference to FIG. 17. In other examples, multiple gate members 120, 320, 420 can be mounted to the same elongated member 110, 310, 410 as will be discussed in more detail below.

FIG. 16 illustrates an example cable manager 500 including an elongated member 310 and a gate member 520. The gate member 520 includes one or more gates 522 that extend transversely outwardly from the elongated member 510. The particular cable manager 500 shown in FIG. 16 is substantially similar to cable manager 300 shown in FIGS. 8-11, except for the configuration of the gates 522 as compared to the gates 322. However, it is noted that this gate configuration can be applied to the designs of any of the cable managers disclosed herein.

In certain implementations, the gates 522 have major surfaces 528 that are not parallel to a surface to which the elongated member 310 mounts. In certain implementations, the gate major surfaces 528 extend generally orthogonally to the panel 200 to which the elongated member 310 would be mounted. In certain implementations, the gates 522 have major surfaces 528 that extend generally parallel to a rotation axis $A_R$ of the gate member 520. In other implementations, the gates 522 can be oriented as any desired angle relative to the elongated member 310.

One or more cable managers 500 can be used in conjunction with any of the cable managers 100, 300, 400 to retain cables within management regions R, R2 of the panel 200 or other surface. The gate orientation would facilitate retaining one or more cables within the management regions R, R2 of the panel 200 when the cable managers 500 are disposed at the management regions R, R2. The gate orientation of the cable managers 500 also would facilitate retaining one or more cables within a sideways boundary of the panel 200 when the cable managers 500 are disposed at the sides of the panel 200.

FIG. 17 illustrates an example cable manager 600 including an elongated member 110 and a gate member 620 that includes one or more gates 622 extending outwardly from the elongated member 110. The particular cable manager 600 shown in FIG. 17 is substantially similar to cable manager 100 shown in FIGS. 1-5, except for the configuration of the gate member 620 as compared to the gate member 120. However, it is noted that this gate member configuration can be applied to the designs of any of the cable managers disclosed herein.

The gate member 620 includes an elongated body 621 and two or more axially spaced sets of gates 622. In the example shown, a first set of gates 622A is axially spaced along the elongated body 621 from a second set of gates 622B. In other implementations, the gate member 620 also can include additional sets of gates. The gates 622A, 622B move (e.g., translate and/or rotate) together with the elongated body 621. Accordingly, the gate member 620 can be used in conjunction with a single locking member 130 to inhibit inadvertent axial movement of the gate member 620 relative to the elongated member 110.

When the cable manager 600 is mounted to a surface (e.g., a panel 200), the first set of gates 622A cooperates with the surface to define a first cable sub-region G1 and the second set of gates 622B cooperates with the first set of gates 622A to define a second cable sub-region G2. A group of cables can be retained at each sub-region G1, G2. The sub-regions G1, G2 facilitate grouping cables with common attributes or a common source. Accordingly, these cables can be subsequently identified/accessed more easily. In an example, cables from one source (e.g., a blade in a switch) can be disposed in a first sub-region and cables from another source (e.g., a different blade, a different switch, etc.) can be disposed in a second sub-region. In another example, the sub-regions can facilitate segregation of different types of cables (e.g., copper and fiber, single-mode and multi-mode, etc.).

In other implementations, cable managers can include multiple gate members that operate independently of one another. For example, multiple gate members 120 could be mounted to the elongated member 110 of FIG. 1. In some such implementations, each gate member 120 would have its own locking member 130. In some such implementations, each gate member 120 would have its own secondary channel 113 extending from the primary channel 112. In an example, the secondary channels 113 would be axially spaced from each other. In other implementations, each gate member 120 may have its own channel arrangement 111.

In other examples, multiple gate members 320, 420 could be mounted to the respective elongated members 310, 410 of FIGS. 8 and 14. In some such implementations, each gate member 320, 420 would have its own deviation section 306, 406. In an example, the deviation sections 306, 406 would be axially spaced from each other. In other such implementations, each gate member 320, 420 may have its own track 305, 405. In still other such implementations, each gate member 320, 420 may have its own threaded section 331, 431.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An adjustable cable manager comprising:
    an elongated member extending axially along a length, the elongated member having an adjustment region that extends along a majority of the length, the elongated member being configured to mount to a surface; and
    a gate member configured to couple to the elongated member, the gate member being movable along the adjustment region of the elongated member, the gate member being configured to be releasably fixed at any point along the adjustment region, the gate member including a gate extending outwardly transverse to the elongated member, the gate member being rotatable relative to the elongated member at one end of the adjustment region;
    wherein the elongated member and the gate member cooperate to define an alignment arrangement that inhibits rotation of the at least one gate relative to the elongated member when the gate member is not disposed at the one end of the adjustment region.

2. The adjustable cable manager of claim 1, wherein the gate member rotates between an open position and a closed position, wherein the gate extends outwardly transverse to the elongated member in a first direction when the gate member is in the open position, and wherein the gate extends outwardly transverse to the elongated member in a second direction when the gate member is in the closed position.

3. The adjustable cable manager of claim 2, wherein the second direction is offset generally orthogonally from the first direction.

4. The adjustable cable manager of claim 1, wherein the gate member includes a plurality of gate members.

5. The adjustable cable manager of claim 1, wherein the gate member includes multiple sets of axially spaced gates.

6. The adjustable cable manager of claim 1, wherein the gate has a major surface extending generally parallel to the surface.

7. The adjustable cable manager of claim 1, wherein the gate has a major surface extending generally transverse to the surface.

8. The adjustable cable manager of claim 1, further comprising a second gate member mounted to the elongated member, the second gate member being movable along at least a portion of the adjustment region of the elongated member independent of the gate member, the second gate member being configured to be releasably fixed at any point along the portion of the adjustment region, the second gate member including a second gate extending outwardly transverse to the elongated member.

9. The adjustable cable manager of claim 1, further comprising a locking member configured to move relative to the gate member between a first position and a second position, the locking member allowing the gate member to move along the adjustment region of the elongated member when the locking member is disposed in the first position, and the locking member fixing the gate member in position relative to the elongated member when the locking member is disposed in the second position.

10. The adjustable cable manager of claim 9, wherein the locking member includes wings defining grip surfaces to facilitate moving the locking member between the first and second positions; and wherein the locking member and the gate member cooperate to define a retention arrangement that inhibits separation of the locking member and the gate member while allowing movement of the locking member between the first and second positions.

11. The adjustable cable manager of claim 9, wherein the elongated member defines a channel extending along the adjustment region and the gate member defines at least a first rider that is configured to translate within the channel as the gate member is moved relative to the elongated member, and wherein the elongated member also defines a secondary channel extending at an angle to the channel, wherein the first rider can translate into the secondary channel to enable the gate member to rotate relative to the elongated member.

12. The adjustable cable manager of claim 1, further comprising a threaded rod disposed within the elongated member and extending along the length of the elongated member, the gate member being mounted to the threaded rod so that rotation of the threaded rod causes the gate member to move axially along the threaded rod relative to the elongated member.

13. The adjustable cable manager of claim 12, wherein the threaded rod includes a knob extending outwardly from the elongated member, the knob being rotationally fixed to the threaded rod so that rotating the knob causes rotation of the threaded rod.

14. The adjustable cable manager of claim 12, wherein the elongated member defines at least one track extending along the adjustment region, the track extending between an exterior of the elongated member and an interior of the elongated member to enable the gate to extend outwardly through the track, wherein a portion of the gate member rides within the track when the gate member is moved along the adjustment region; and wherein the track contours at one end of the adjustment region to enable the gate to revolve about the threaded rod.

15. The adjustable cable manager of claim 14, wherein the gate rides within the track when the gate member is moved along the adjustment region.

16. The adjustable cable manager of claim 14, wherein a frame of the gate member encircles the elongated member, and wherein the gate extends outwardly from the frame.

17. A cable management system comprising:
    a panel at which a plurality of cable management regions are defined; and
    a plurality of cable managers mounted to the panel, each cable manager including an elongated member and a gate that is configured to rotate to selectively inhibit or allow access to a respective one of the cable management regions, the gate also being configured to translate to adjust a depth of the respective cable management region and to be axially fixed at any point along an adjustment region of the cable manager, the gate being inhibited from rotation along a majority of a length of the elongated member.

18. The cable management system of claim 17, wherein each cable manager includes a locking member that is configured to move relative to the gate between an activation position and a deactivation position, wherein the gate is axially fixed when the locking member is in the activation position, and wherein the gate is axially movable when the locking member is in the deactivation position.

19. The cable management system of claim 17, wherein a first cable manager includes a threaded rod along which the gate travels.

20. The cable management system of claim 17, wherein the gate of at least a first of the cable managers is oriented so that a major surface of the gate of the first cable manager is oriented generally parallel to the panel; and wherein the gate of at least a second of the cable managers is oriented so that a major surface of the gate of the second cable manager is oriented generally transverse to the panel.

21. A method of managing cables along a panel to which a plurality of elongated members are mounted, the method comprising:
   rotating a gate member relative to a respective one of the elongated members to an open position to uncover an entrance to a management region defined between the respective elongated member and an adjacent elongated member;
   inserting at least one cable into the management region;
   rotating the gate member relative to the respective elongated member to a closed position to move a gate of the gate member across the entrance to the management region to close the management region; and
   translating the gate member axially along the respective elongated member while the gate member is disposed in the closed position to adjust a size of the management region to accommodate the at least one cable.

22. An adjustable cable manager comprising:
   an elongated member extending axially along a length, the elongated member having an adjustment region that extends along a majority of the length, the elongated member being configured to mount to a surface, the elongated member defining a channel extending along the adjustment region, and the elongated member also defining a secondary channel extending at an angle to the channel;
   a gate member configured to couple to the elongated member, the gate member being movable along the adjustment region of the elongated member, the gate member being configured to be releasably fixed at any point along the adjustment region, the gate member including a gate extending outwardly transverse to the elongated member, the gate member defining at least a first rider that is configured to translate within the channel as the gate member is moved relative to the elongated member and, wherein the first rider can translate into the secondary channel to enable the gate member to rotate relative to the elongated member; and
   a locking member configured to move relative to the gate member between a first position and a second position, the locking member allowing the gate member to move along the adjustment region of the elongated member when the locking member is disposed in the first position, and the locking member fixing the gate member in position relative to the elongated member when the locking member is disposed in the second position.

* * * * *